US012099871B2

(12) United States Patent
Pal et al.

(10) Patent No.: US 12,099,871 B2
(45) Date of Patent: Sep. 24, 2024

(54) SYSTEM AND METHOD FOR BATCH AND SCHEDULER MIGRATION IN AN APPLICATION ENVIRONMENT MIGRATION

(71) Applicant: Hexaware Technologies Limited, Navi Mumbai (IN)

(72) Inventors: Chirodip Pal, Chennai (IN); Natarajan Ganapathi, Chennai (IN); Meenakshisundaram Padmanaban, Chennai (IN)

(73) Assignee: HEXAWARE TECHNOLOGIES LIMITED, Navi Mumbai (IN)

( * ) Notice: Subject to any disclaimer, the term of this patent is extended or adjusted under 35 U.S.C. 154(b) by 477 days.

(21) Appl. No.: 17/472,163

(22) Filed: Sep. 10, 2021

(65) Prior Publication Data

US 2023/0038345 A1    Feb. 9, 2023

(30) Foreign Application Priority Data

Jul. 27, 2021    (IN) .............................. 202121033779

(51) Int. Cl.
*G06F 9/48*    (2006.01)
*G06F 9/50*    (2006.01)

(52) U.S. Cl.
CPC .......... *G06F 9/4881* (2013.01); *G06F 9/5038* (2013.01); *G06F 9/505* (2013.01)

(58) Field of Classification Search
CPC ...... G06F 9/4881; G06F 9/5038; G06F 9/505; G06F 8/72
See application file for complete search history.

(56) References Cited

U.S. PATENT DOCUMENTS

| 2012/0296853 | A1* | 11/2012 | Galloway | ................ | G06F 8/76 |
| | | | | | 705/400 |
| 2013/0007216 | A1 | 1/2013 | Fries et al. | | |
| 2013/0219385 | A1* | 8/2013 | Geibel | ................ | G06F 9/5088 |
| | | | | | 718/1 |

(Continued)

OTHER PUBLICATIONS

Andreas Aronsson, Cloudifying a legacy batch-processing system, University of Gothenburg, 2017 (Year: 2017).*

(Continued)

*Primary Examiner* — Dong U Kim
(74) *Attorney, Agent, or Firm* — Muncy, Geissler, Olds & Lowe, P.C.

(57) ABSTRACT

A method of batch and scheduler migration assesses a batch job, scans it's scheduling mechanism and components, ascertains a quantum change for migrating the batch job to a target batch service and forecasts an assessment statistic that provides at least one functional readiness and a timeline to complete the migration of the batch job. The method generates a transformed batch job structure by breaking the batch job according to the target batch service while retaining the scheduling mechanism. Further, it updates containerized batch service components of the target batch service as per the forecasted assessment statistic and the transformed batch job structure, and migrates the batch job to the target batch service by re-platforming the updated containerized batch service components.

20 Claims, 7 Drawing Sheets

(56) References Cited

U.S. PATENT DOCUMENTS

| | | | |
|---|---|---|---|
| 2015/0268986 A1* | 9/2015 | De Lima Junior | ... G06F 9/4843 |
| | | | 718/101 |
| 2017/0155723 A1 | 6/2017 | Sharma et al. | |
| 2017/0192758 A1* | 7/2017 | Apte | ........................ G06F 8/76 |
| 2018/0276079 A1* | 9/2018 | Zhang | ................ G06F 16/2282 |
| 2019/0028355 A1 | 1/2019 | Subramanian et al. | |
| 2019/0235918 A1* | 8/2019 | Liu | ...................... G06F 3/0617 |
| 2020/0387356 A1 | 12/2020 | Davis et al. | |

OTHER PUBLICATIONS

Jinesh Varia: "Amazon Web Services Migrating Your Existing Applications to the AWS Cloud—A Phase-driven Approach to Cloud Migration", Oct. 1, 2010 (Oct. 1, 2010), pp. 1-23.

Fowley Frank et al: "Software System Migration to Cloud-Native Architectures for SME-Sized Software Vendors", Jan. 11, 2017 (Jan. 11, 2017), Advances In Biometrics : International Conference, ICB 2007, Seoul, Korea, Aug. 27-29, 2007 ;Proceedings; [Lecture Notes In Computer Science; Lect.Notes Computer], Springer, Berlin, Heidelberg, pp. 498-509.

International Search Report and Written Opinion issued with respect to Application No. PCT/IB2021/058197.

\* cited by examiner

SYSTEM AND METHOD FOR BATCH AND SCHEDULER MIGRATION IN AN APPLICATION ENVIRONMENT MIGRATION

FIELD OF THE INVENTION

The present disclosure generally relates to the field of computers, more specifically the present disclosure relates to a system and method for batch and scheduler migration in an application environment migration which allows batch jobs and associated schedulers to be automatically migrated from an older environment to a newer and faster environment without the cumbersome hassle and time being taken by users, while maintaining structural soundness and quality standards.

BACKGROUND OF THE INVENTION

With the changing times, technology has also changed and from the invention of the wheel, we now stand at an era where commute can be ordered through a mobile device. In such, technology has taken a huge leap from times that computers were as big as ballrooms to now when they are as small as a thumbnail. Little by little, we carved technology to help the human race by way of multiple applications. In this ever-changing and ever-reforming field of technology, the application environments keep improving and there arises a necessity to keep updating the applications to better-suit their advanced requirements.

Batch jobs are unit of work executed by computing resources. Generally, batch jobs handle a large amount of data that too all at once. A job scheduler regulates when the batch job should run such as based on specific interval (specific time of day, week, month) or based on specific action (file arrival, event happened, based on completion of any job, etc.). It provisions batch execution environment to compute resources to run the jobs, monitoring, capture errors and recovery, output, etc., manages the job stages such as, submitted, pending, runnable, starting, running, succeeded, or failed. It further manages queueing the jobs, such as priority order, hold execution, load balancing. It also manages event monitoring i.e. to watch which event, when to watch, and reacting to an event.

Conventionally, batch and scheduler of an application environment were migrated onto newer environments by completely reproducing the batch and scheduler in accordance with the newer environment which was time-taking and did not provide much benefit of the already existing batch and scheduler ecosystem. With quicker environment updates, there has been inadequate time to update batch and scheduler all manually since by the time batch and scheduler gets migrated to a newer environment, a newer one would be released. Further, migrating batch and scheduler to different environments also came with its own unique challenges including but not limited to assuring the connections does not get lost during transformation, and that the migration corresponds to the older and newer environments.

Cloud adoption has become mainstream with enterprises leveraging Cloud as a key part of their IT strategy. This is evident from the year on year growth of leading cloud providers like AWS, Azure and GCP over the past few years. As a first phase these enterprises have successfully adopted cloud by developing new applications on cloud using cloud native design principle and hosting batch and scheduler on cloud solutions. Having realized success with that, enterprises are now looking for ways to migrate rest of their important applications on cloud to realize broad benefits of cloud. The challenge however is migrating existing applications to cloud poses a different set of issues, for example what is the right cloud migration approach, balancing of risk, cost and timeline to complete the cloud migration, complexity of existing applications especially old batch and scheduler or applications without an SME, maximize total cost of ownership (TCO) savings and increase productivity for future releases, execution speed, enhanced performance, and the like.

Due to the complex parameters and effort required in migrating batch and scheduler of application environments, along with the crunch in time with regular updates, there exists a need for developing a system and method for batch and scheduler migration in an application environment migration which migrates batch and scheduler from one environment to another without or minimally requiring manual assistance while addressing the variety of issues associated with batch and scheduler, its connections and components.

SUMMARY OF THE INVENTION

This summary is provided to introduce concepts related to systems and methods for batch and scheduler migration in an application environment migration and the concepts are further described below in the detailed description. This summary is neither intended to identify essential features of the claimed subject matter nor is it intended for use in determining or limiting the scope of the claimed subject matter.

In one implementation, a method for batch and scheduler migration in an application environment migration is disclosed. The method comprising assessing, by a processor 122 of an application server 102, a batch job 412 of a source application environment and scanning, by the processor 122, at least one scheduling mechanism and components 412a, . . . , 412n of the batch job 412. The method further comprising ascertaining, by the processor 122, a quantum change for migrating the batch job 412 to a target batch service 430 and forecasting, by the processor 122, an assessment statistic 302 that provides at least one functional readiness 304 and a timeline 306 to complete the migration of the batch job 412. The method further comprising generating, by the processor 122, a transformed batch job structure 530a, . . . , 530n that is generated by breaking the batch job 412 in accordance with the target batch service 430 while retaining the scheduling mechanism and updating, by the processor 122, containerized batch service components 532a, . . . , 532n of the target batch service 430 as per the forecasted assessment statistic 302 and the transformed batch job structure 530a, . . . , 530n. Thereby, migrating, by the processor 122, the batch job 412 to the target batch service 430, wherein the migration re-platforms the updated containerized batch service components 532a, . . . , 532n.

In yet another implementation, the quantum change for migrating the batch job 412 to the target batch service 430 is calculated on the basis of the size and complexity of the batch job 412.

In yet another implementation, the transformed batch job structure 530a, . . . , 530n is generated utilizing a continuous integration and deployment framework 150 and an automated test framework 150.

In yet another implementation, the assessment statistic 302 provides at least one inhibitor to complete the migration of the batch job 412.

In yet another implementation, the transformed batch job structure 530a, . . . , 530n is generated in accordance with the target batch service 430 while retaining connections between the components 412*a*, . . . , 412*n* of the batch job 412.

In yet another implementation, the transformed batch job structure 530*a*, . . . , 530*n* is identified by an AI Engine 152.

In yet another implementation, the batch job 412 of an application environment migrates to the target batch service 430 comprising the steps of: a source batch job to target batch service re-development, a source batch job to target batch service re-factoring, a source batch job to target batch service re-hosting, and a source batch job to target batch service re-platforming.

In yet another implementation, the target batch service 430 is a cloud based batch service ecosystem.

In another implementation, the method comprises, implementing, by the processor 122, batch service definition and service queue in accordance with the target application environment.

In another implementation, the method comprises, accessing, by the processor 122, an application code 202 comprising a business logic, links, rule engines, libraries of available environments, standard tools, and coding languages.

In one implementation, a system for batch and scheduler migration in an application environment migration is disclosed. The system comprising a processor 122 and a memory 126 coupled to the processor 122, wherein the processor 122 executes a plurality of modules 128 stored in the memory 126. The plurality of modules 128 comprising an assessment module 130, for assessing a batch job 412 of a source application environment, scanning at least one scheduling mechanism and components 412*a*, . . . , 412*n* of the batch job 412 and ascertaining a quantum change for migrating the batch job 412 to a target batch service 430, the assessment module 130 forecasts an assessment statistic 302 that provides at least one functional readiness 304 and a timeline 306 to complete the migration of the batch job 412. The plurality of modules 128 further comprising a re-factor module 132, for generating a transformed batch job structure 530*a*, . . . , 530*n* that is generated by breaking the batch job 412 in accordance with the target batch service 430 while retaining the scheduling mechanism. The plurality of modules 128 further comprising, a re-platform module 134, for updating containerized batch service components 532*a*, . . . , 532*n* of the target batch service 430 as per the forecasted assessment statistic 302 and the transformed batch job structure 530*a*, . . . , 530*n* and migrating the batch job 412 to the target batch service 430, wherein the migration re-platforms the updated containerized batch service components 532*a*, . . . , 532*n*.

In yet another implementation, the system has the quantum change for migrating the batch job 412 to the target batch service 430 that is calculated on the basis of the size and complexity of the batch job 412.

In yet another implementation, the system has the transformed batch job structure 530*a*, 530*n* that is generated utilizing a continuous integration and deployment framework 150 and an automated test framework 150.

In yet another implementation, the system has the assessment statistic 302 that provides at least one inhibitor to complete the migration of the batch job 412.

In yet another implementation, the system has the transformed batch job structure 530*a*, . . . , 530*n* that is generated in accordance with the target batch service 430 while retaining connections between the components 412*a*, . . . , 412*n* of the batch job 412.

In yet another implementation, the system has the transformed batch job structure 530*a*, . . . , 530*n* that is identified by an AI Engine 152.

In yet another implementation, the system has the batch job 412 of an application environment migrates to the target batch service 430 comprising the steps of: a source batch job to target batch service re-development, a source batch job to target batch service re-factoring, a source batch job to target batch service re-hosting, and a source batch job to target batch service re-platforming.

In yet another implementation, the system has the target batch service 430 that is a cloud based batch service ecosystem.

In another implementation, the system comprises the re-platform module 134 further comprising: implementing, by the processor 122, batch service definition and service queue in accordance with the target application environment.

In another implementation, the system comprises the plurality of modules 128 that further executes accessing, by the processor 122, an application code 202 comprising a business logic, links, rule engines, libraries of available environments, standard tools, and coding languages.

It is primary object of the subject matter to provide a system and method for batch and scheduler migration in an application environment migration that may be used to migrate an application from one platform to another and more specifically, it may be used to migrate a batch and scheduler from an older environment to a newer environment. The system and method for batch and scheduler migration in an application environment migration may be customized based on the batch and scheduler to be migrated as well as the environments including the older environment the batch and scheduler is developed in and the newer environment to which the batch and scheduler has to be migrated.

It is another object of the subject matter to provide a batch and scheduler migration in an application environment migration that caters to several batches and schedulers while retaining their connections. Furthermore, the system and method for batch and scheduler migration in an application environment migration may be able to migrate the selected batches and schedulers to be migrated from a wide range of environments to another wide range of environments or ecosystems.

It is another object of the subject matter to provide a system and method for batch and scheduler migration in an application environment migration that migrates a batch and a scheduler in an automated manner without the requirement of manual inputs or in a hybrid manner including automatic and manual steps.

It is another object of the subject matter to provide a batch and scheduler migration in an application environment migration that reduces the time and effort taken by development teams to migrate a batch and scheduler from an older environment to a newer environment, by eliminating the repeatable patterns of work done by the development team, thereby also reducing costs.

It is another object of the subject matter to provide a batch and scheduler migration in an application environment migration that provides increased control over inter service communications, better performance and scalability, increase reliability and efficiency, and ensures that data is sent securely.

It is another object of the subject matter to provide a batch and scheduler migration in an application environment migration that can be utilized for migrating source/traditional batch jobs and scheduler mechanism including but not limited to batch jobs, and the like, to target cloud based popular batches and schedulers including but not limited to Spring Batch, Azure Batch, AWS Batch, Azure Logical App, and the like.

It is another object of the subject matter to provide a batch and scheduler migration in an application environment migration that migrates batch and scheduler from an older environment to a newer one by reducing implementation costs, reducing total cost of ownership thereby increasing profitability, increasing the execution speed, enhancing the application's performance and enhancing the application's productivity.

It is another object of the subject matter to provide a number of advantages depending on the particular aspect, embodiment, implementation and/or configuration.

It is another object of the subject matter to provide a platform that can provide reliable execution, scalability, and value-added services, while controlling operating effort and costs.

It is another object of the subject matter to efficiently manage numerous instances simultaneously, work in different regulatory requirements, enable resources to collaborate and work together closely, efficiently and collectively with user friendly interfaces.

These and other implementations, embodiments, processes and features of the subject matter will become more fully apparent when the following detailed description is read with the accompanying experimental details. However, both the foregoing summary of the subject matter and the following detailed description of it represent one potential implementation or embodiment and are not restrictive of the present disclosure or other alternate implementations or embodiments of the subject matter.

BRIEF DESCRIPTION OF THE DRAWINGS

A clear understanding of the key features of the subject matter summarized above may be had by reference to the appended drawings, which illustrate the method and system of the subject matter, although it will be understood that such drawings depict preferred embodiments of the subject matter and, therefore, are not to be considered as limiting its scope with regard to other embodiments which the subject matter is capable of contemplating. Accordingly.

DETAILED DESCRIPTION OF THE INVENTION

Figure 1:
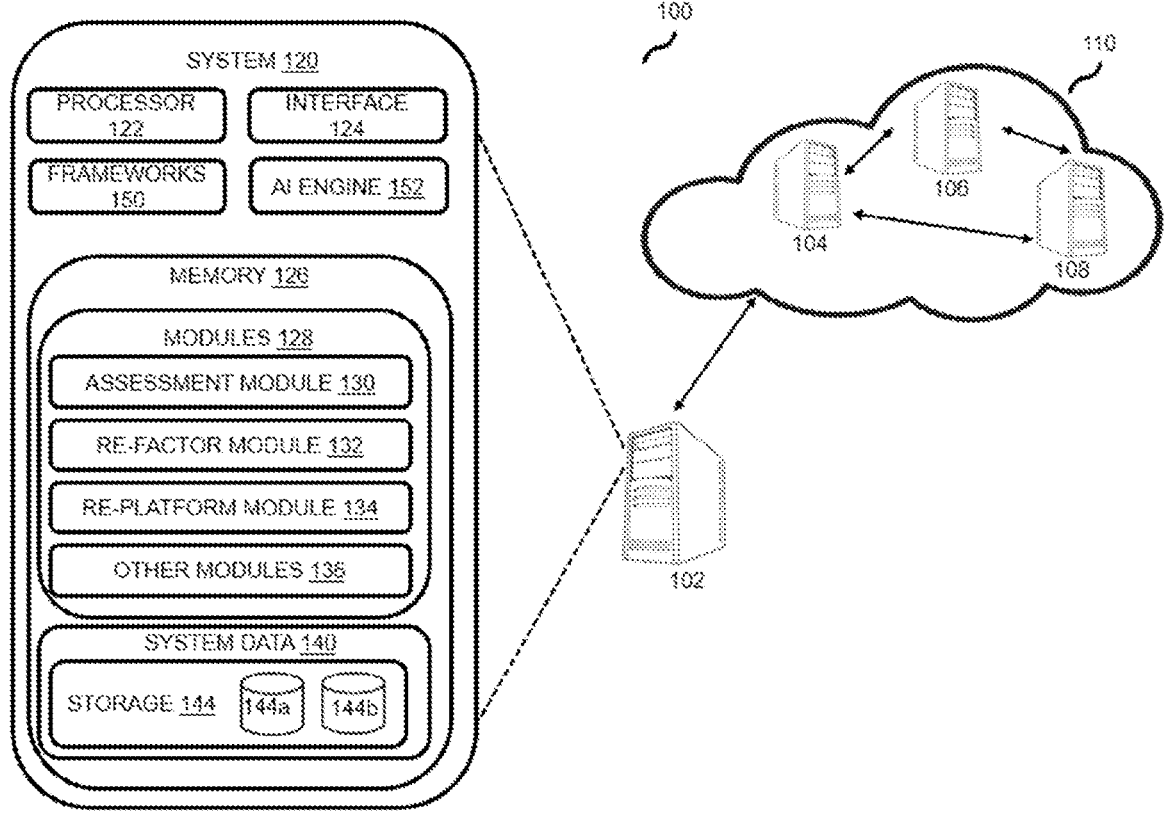
FIG. 1 illustrates a schematic module diagram depicting a method of batch and scheduler migration in an application environment migration, in accordance with an embodiment of the present subject matter.

The following is a detailed description of implementations of the present disclosure depicted in the accompanying drawings. The implementations are in such detail as to clearly communicate the disclosure. However, the amount of detail offered is not intended to limit the implementations but it is to cover all modifications, equivalents, and alternatives falling within the spirit and scope of the present disclosure. While aspects of described systems and methods for batch and scheduler migration in an application environment migration can be implemented in any number of different computing systems, environments, and/or configurations, the embodiments are described in the context of the following exemplary system(s).

The present disclosure provides a batch and scheduler cloud re-platforming from a source batch job and associated scheduler of a source application environment to a target batch service and corresponding scheduler of a target application environment. The cloud re-platforming of batch and scheduler involves migrating an existing on-premise batch and scheduler to cloud to make the source batch job and associated scheduler of the source application environment work efficiently by taking advantage of scalability and elastic features of cloud. The source batch job and associated scheduler of the source application environment structure will also be modified to reduce a total cost of ownership (TCO) of these batch and scheduler which involve adopting more open source and cloud friendly software to remove a licensing cost for virtual machines, application server and databases. Actual TCO reduction will vary from batch and scheduler to batch and scheduler and determined after the source batch job and associated scheduler assessment. The present disclosure lists a few important steps to be performed in batch and scheduler, although they may vary with batch and schedulers, modify existing batch and scheduler to work effectively on Cloud Platform or PaaS, all blocker related to source and on-premise design patterns will be changed, all underlying links, dependencies, connections, libraries will be upgraded to make the source batch job and associated scheduler compatible with container or PaaS, application servers (Weblogic, WebSphere, JBoss, . . . , and alike) and databases may be replaced with open source cloud friendly software, monolith application may be de-coupled into smaller macro services for efficiency and velocity, source batch job and associated scheduler may be transformed and re-platformed in target cloud based batch service and scheduler.

The present disclosure provides a mechanism for cloud re-platforming by simple containerization involving removing all code blockers that impede containerization and deploying a source application in a container like Docker to make it work on Cloud. Further, the source application release process will also be automated which involves, test case and CI/CD automation. Still further, the source application and/or the source database may also be re-platformed to a lightweight open source server like Tomcat for JAVA applications and a legacy DB2 database to reduce the TCO of these applications by eliminating the license cost and reducing the compute cost on cloud. However, to guarantee stability and performance the monolith application will have to be broken down to smaller services or refactored database structure or transformed message broker, or transformed batch and scheduler make all of these applications stateless and deploy them into separate Tomcat servers with each deployed in a separate container. Thus, the source application will be migrated to a target application platform by decoupling the monolith application and exposing it through APIs by using macro-services concepts to make it cloud ready application. Along with breaking a monolithic application into macro-services, CI/CD will also be implemented to achieve the fast and automated deployment. It runs batch and schedule re-platforming that includes transforming source batch jobs and associated schedulers with target batch service such as Spring batch, Azure service bus, Azure Event Hub, and AWS SNS. A component wise structure and a step wise method is listed below.

FIG. 1 illustrates a schematic module diagram 100 depicting a method of batch and schedule migration in an application environment migration, in accordance with an embodiment of the present subject matter.

In one implementation, a batch and scheduler migration in an application environment migration system 120 implements a method for batch and schedule migration in an application environment migration on a server 102, the system 120 includes a processor(s) 122, interface(s) 124, framework(s) 150, an AI Engine 152, and a memory 126 coupled to the processor(s) 122. The processor(s) 122 may be implemented as one or more microprocessors, microcomputers, microcontrollers, digital signal processors, central processing units, state machines, logic circuitries, and/or any devices that manipulate signals based on batch and schedule migration instructions. Among other capabilities, the processor(s) 122 is configured to fetch and execute computer-readable instructions stored in the memory 126. The framework 150 includes but not limited to a continuous integration and continuous deployment framework, an automated test framework, and the like. The AI Engine 152 including but not limited to a database (DB) re-platform engine, an app re-platform engine, a batch and scheduler re-platform engine, an open source AI engine, and the like.

Although the present disclosure is explained by considering a scenario that the system is implemented as an application on a server, the systems and methods can be implemented in a variety of computing systems. The computing systems that can implement the described method(s) include, but are not restricted to, mainframe computers, workstations, personal computers, desktop computers, minicomputers, servers, multiprocessor systems, laptops, tablets, SCADA systems, smartphones, mobile computing devices and the like.

The interface(s) 124 may include a variety of software and hardware interfaces, for example, a web interface, a graphical user interface, etc., allowing the system 120 to interact with a user. Further, the interface(s) 124 may enable the system 120 to communicate with other computing devices, such as web servers and external data servers (not shown in figure). The interface(s) 124 can facilitate multiple communications within a wide variety of networks and protocol types, including wired networks, for example LAN, cable, etc., and wireless networks such as WLAN, cellular, or satellite. The interface(s) 124 may include one or more ports for connecting a number of devices to each other or to another server.

A network used for communicating between all elements in application server and cloud environment may be a wireless network, a wired network or a combination thereof. The network can be implemented as one of the different types of networks, such as intranet, local area network LAN, wide area network WAN, the internet, and the like. The network may either be a dedicated network or a shared network. The shared network represents an association of the different types of networks that use a variety of protocols, for example, Hypertext Transfer Protocol HTTP, Transmission Control Protocol/Internet Protocol TCP/IP, Wireless Application Protocol WAP, and the like, to communicate with one another. Further the network may include a variety of network devices, including routers, bridges, servers, computing devices. The network further has access to storage devices residing at a client site computer, a host site server or computer, over the cloud, or a combination thereof and the like. The storage has one or many local and remote computer storage media, including one or many memory storage devices, databases, and the like.

The memory 126 can include any computer-readable medium known in the art including, for example, volatile memory (e.g., RAM), and/or non-volatile memory (e.g., EPROM, flash memory, etc.). In one embodiment, the memory 126 includes module(s) 128 and system data 140.

The modules 128 further includes an assessment module 130, a re-factor module 132, a re-platform module 134, and other modules 136 including but not limited to a blocker assessment module, a script generator module and the like. The script generator module further including but not limited to a test case generator a build script generator, a docker script generator, a pipeline script generator, a deployment script generator, and the like. It will be appreciated that such modules may be represented as a single module or a combination of different modules. Additionally, the memory 126 further includes system data 140 that serves, amongst other things, as a repository for storing data fetched, processed, received and generated by one or more of the modules 128. The system data 140 includes, for example, operational data, workflow data, and other data at a storage 144. The system data 140 has the storage 144, represented by 144a, 144b, . . . , 144n, as the case may be. In one embodiment, the system data 140 has access to the other databases over a web or cloud network. The storage 144 includes multiple database including but not limited to an assessment module data, a re-factor module data, a re-platform module data, libraries, link identifiers, a database adapter, a database dictionary, a database parser, a technology dictionary, a file adapter, an application parser, a pattern recognizer, open source libraries, technology stack, and the like. It will be appreciated that such databases may be represented as a single database or a combination of different databases. In one embodiment data may be stored in the memory 126 in the form of data structures. Additionally, the aforementioned data can be organized using data models, such as relational or hierarchical data models.

The server 102 is further connected to a cloud environment 110 have has a plurality of computing systems including but not limited to a target application environment server 104, and a target application environment server 106, databases including but not limited to a database 108. It is imperative that the computing systems and databases communicate with each other under a cloud computing rules and also with the server 102 under the web or other available communication mediums/protocols. The computing systems 104 generally, are distributed processing systems including multiple computing devices connected by and communicating over a network. Software applications may be run "in the cloud" by configuring them to execute across one or more of the computing devices in a particular cloud computing system. The computing devices of a cloud computing system may each execute separate copies of the software application, or, in some cases, the operations of the software application may be split among different computing devices and executed in parallel. A cloud computing system may include a plurality of cloud computing instances representing resources available for executing applications. Each instance may be a physical computing device having particular capabilities (storage size, processing speed, network bandwidth, etc.), or may be a virtual computing device having particular capabilities. A particular cloud computing system may offer different instance types having different sets of capabilities for executing software applications.

In one implementation, at first, a user including but not limited to a migration professional, a database administrator, an application developer, a quality analyst or a test professional may use a user access device to access the system 120 via the interface 124 using the server 102. The working of the system 120 and related method and associated modules, sub modules, methods may be explained in detail also using FIG. 2, FIG. 3, FIG. 4, FIG. 5, FIG. 6, and FIG. 7 explained below.

In one embodiment, the system 120 receives a user instruction data by the interface 124 on the server 102. The modules 128 of the system 120 processes the instructions using the processor 122 while using the system data 140, the other modules 136, the frameworks 150 and supporting components. The assessment module 130 for batch and scheduler migration in an application environment migration is utilized before initiating the migration of a batch and scheduler from one environment to another.

The assessment module 130 performs an assessment of a batch job 412 of a source application environment and scans at least one scheduling mechanism and components 412a, 412b, . . . , 412n of the batch job 412 to ascertain a quantum change and an in-depth understanding of a quantum change the source batch job and associated scheduler of the source application environment will have to undergo while assessing the risk, costs, timeline as well as the impact the change would make to other dependent applications for migrating the batch job 412 to a target batch service 430. The assessment module 130 forecasts an assessment statistic 302 that provides at least one functional readiness 304 and a timeline 306 to complete the migration of the batch job 412. The assessment module 130 understands the underlying connections, dependencies developed by various developers having a variety of styles. Furthermore, a forecasted assessment report 302 generated by the assessment module 130 using the AI engine 152 provides in-depth details regarding but not limited to a timeline required, a percentage of components/structure that needs to be changed, a plurality of readiness parameters, a plurality of inhibitors or code blockers and warnings along with the reason, highlighted portions where batch and scheduler components needs to be modified, number of services a monolith can be broken into, the kind of services a monolith may be broken into and the readiness of the batch and scheduler for continuous integration and continuous deployment. The assessment report 302 generated by the assessment module 130 provides an accurate estimate and timeline to complete the migration of the source batch job and associated scheduler of the source application environment. In one embodiment, an RPA bot is configured to generate an assessment report 302 using a proactive batch and scheduler migration of an application environment migration forecasting (PAEMF) algorithm. In one embodiment, the RPA bot is a software bot or a combination of a software and hardware bot. In an embodiment, the software bot is a computer program enabling a processor to perform robotic process automation by utilizing AI. In another embodiment, the bot as a combination of hardware and software, where the hardware includes memory, processor, controller and other associated chipsets especially dedicated to perform functions that enable robotic process automation for batch and scheduler migration in an application environment migration.

The re-factor module 132 for batch and scheduler migration in an application environment migration supports the automated re-platforming for the source batch job and associated scheduler migration in an application environment migration to the target batch service and associated scheduler migration in an application environment migration by generating a transformed batch job 550 with structure 530a, 550b, . . . , 530n that is generated by breaking the batch job 412 in accordance with the target batch service 430 while retaining the scheduling mechanism. The re-factor module 132 generates the transformed batch job structure 530a, . . . , 530n that is generated utilizing a continuous integration and deployment framework 150, an automated test framework 150, and middleware re-platform and environment-friendly design patterns.

The re-platform module 134 for batch and scheduler migration in an application environment migration supports the automated re-platforming for the source batch job and associated scheduler migration in an application environment migration to the target application environment to transform a batch and scheduler from one environment to another on the basis of the size of the batch and scheduler as well as its complexity. The re-platform module 134 updates containerized batch service 532 with components 532a, 532b, 532c, . . . , 532n of the target batch service 430 as per the forecasted assessment statistic 302 and the transformed batch job structure 530a, . . . , 530n and migrating the batch job 412 to the target batch service 430, wherein the migration re-platforms the updated containerized batch service components 532a, . . . , 532n. The re-platform module 134 also perform activities including but not limited to integrating patterns of the source application environment with design patterns of the target application environment, fine-tuning the code, resolving deployment issues, implementing security in order to ascertain the migrated application to be fully functional, and the like. The re-platform module 134 assists in multiple forms of environment migration including but not limited to a re-hosting environment migration, batch job and scheduler re-platforming, batch job and scheduler re-factoring and a native batch job and scheduler development, and the like.

The blocker assessment module of the other modules 136, any application like a monolithic web application having on-premise design patterns may be inputted in the system and method for batch and scheduler migration in an application environment migration wherein the blocker assessment module of the system and method for batch and scheduler migration in an application environment migration may discover patterns in the on-premise design patterns of the monolithic web application. Furthermore, this information may be transferred to the automated re-platforming module of the system and method for batch and scheduler migration in an application environment migration as per FIG. 1.

The reference architecture of the system 120 further has the supporting components, such as: test generator—test generator generates the test case for unit, functional and performance test cases for generated API. Build Script Generator—build script generator generates the scripts to successfully build and run the application. Docker Script Generator—Docker script generator generates the scripts to containerize the application and its dependencies. Pipeline Script Generator—pipeline script generator generates the scripts to create the CI/CD pipeline for dev, test and prod environments. Deployment Script Generator—deployment script generator generates the scripts to deploy the applications to the target environment. Database Adapter—database adapter utility establishes the connectivity to multiple database servers such as IBM DB2, Oracle, Microsoft SQL Server, Sybase ASE and PostgreSQL. Database Dictionary—database dictionary contains vast database related keywords and built-in functions used by the multiple database servers mentioned above. Database Parser—database parser parses the database objects by using the database dictionary to find the patterns which are not compatible with the target database. AI Engine—AI engine identifies the existing and potential macro/micro services in the legacy application. Batch and scheduler Re-platform Engine—batch and scheduler re-platform engine re-platforms the source batch job and associated scheduler objects such as definitions, scheduling mechanism, and queues etc. to the target batch service and associated scheduler compatible objects. File Adapter—file adapter provides access to the source files of the application. the files are scanned to prepare the report and eventually re-platformed as the target application. Technology Dictionary-technology dictionary contains vast technology related patterns used inside the monolith applications. Application Parser—application parser parses the application source code with the help of pattern recognizer to find out the whole inventory of the technologies the application is using. this inventory is used for the assessment and re-platforming. Pattern Recognizer—pattern recognizer recognizes the pattern based on the technology dictionary to find the technologies used in the application. App Re-platform Engine—App re-platform engine re-platforms the source application which was parsed by the application parser. this engine generates the application which is ready to be deployed to the cloud. Technology Stack including but not limited to JAVA 1.8; Maven; JUnit, NUnit, XUnit JMeter; Docker Jenkins; AWS CLI, Azure CLI, and the like.

Figure 2:
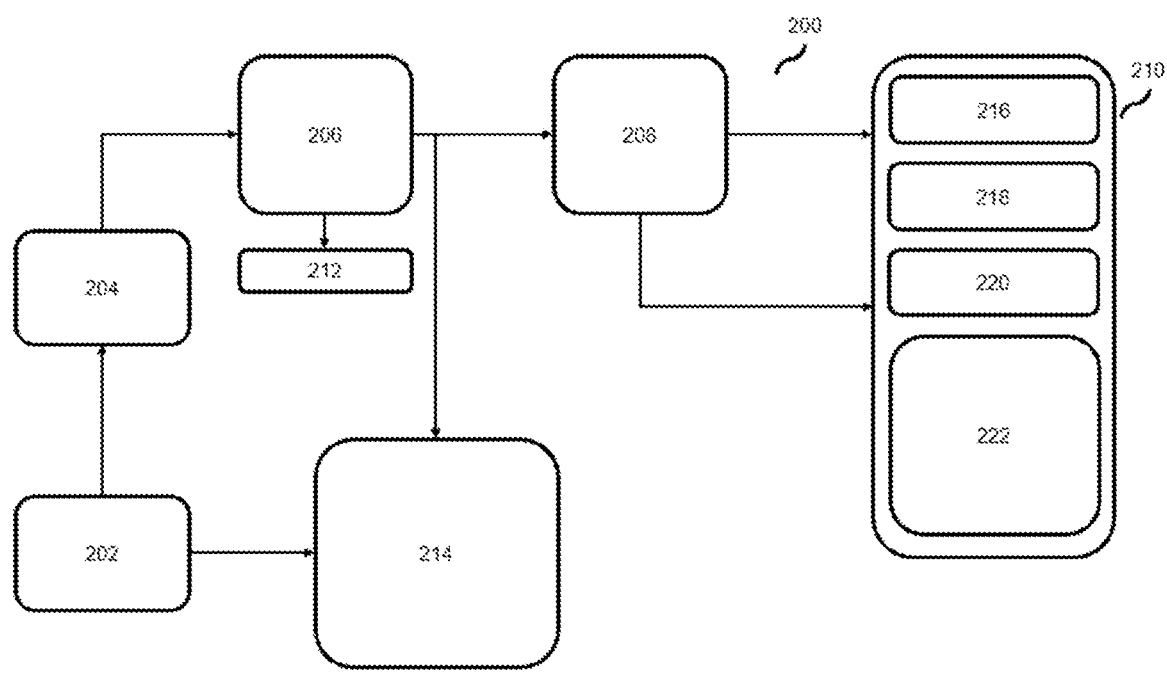
FIG. 2 illustrates a flowchart describing the working of an exemplary batch and scheduler migration system in an application environment migration system, in accordance with an embodiment of the present subject matter.

FIG. 2 illustrates a flowchart 200 describing the working of an exemplary batch and scheduler migration system in an application environment migration system, in accordance with an embodiment of the present subject matter.

The present disclosure depicts two important activities which are a source application environment assessment and a source batch job and associated scheduler transformation to the desired target platform. These two activities are explained below in the flowchart 200.

In one embodiment, a monolith web application 202, such as a JAVA application or a .NET application, being a source application of a source application environment is a source application of a source application environment. The monolith web application 202 is linked to various supporting components 204, including but not limited to, databases, batch, integration, App, scheduler, on-premise ecosystem component, and the like. Functioning of a source batch job and associated scheduler 412 of the source ecosystem components linked to the source application environment is further detailed out.

In a first step, a cloud blocker assessment 206 assess the source application and generates an assessment report 212 comprising code impediments, source code insights, and on-premise design patterns 214. The cloud blocker assessment 206 also assess the source application, batch and scheduler, scans the batch and scheduler connections and generates an assessment report 212 comprising batch jobs lists, its connections, associated scheduler mechanisms or rules, links and dependencies. The on-premise design patterns 214 further including, but not limited to EJB, RMI, STRUTS/SPRING, SOAP/XML, JSP/ASP, COM/COM++, ESB, and the like. The assessment of the source application involves technology stack of the current applications and code analysis. The assessment provides automated insights into the time, effort and risk involved in re-platforming the source application, the source database, the source batch job and associated scheduler and other supporting components including but not limited to message broker. The assessment includes analysis of the source batch job, associated schedulers and components, where it performs an automated assessment of the source batch job 412 and associated scheduler including links, connection and other dependencies and identifies the inhibitors or blockers (Packages/Frameworks/API/Libraries etc.) which will fail the containerized cloud migration of the batch and scheduler readiness parameters and thereby provides a detailed assessment report 212. It performs this code assessment for entire source application ecosystem including applications, databases, batch jobs and its schedulers, integration & message brokers, build and deployment modules. The cloud blocker assessment 206 gets an in depth understanding of the quantum of changes the source application environment will have to go through to assess the risk, cost, timeline and the impact to other dependent components and applications. The report primarily provides percentage of code that needs to be changed, code readiness, blockers and warnings along with the reason, exact places where the code needs to be modified, number of services into which the monolith can be broken down, DevOps and CI/CD readiness, and a timeline for such execution.

In the next step, an automated batch and scheduler transformation/re-platforming 208 for application and supporting components re-platforming from a source environment to a target environment is performed to generate a cloud ready application and supporting components 210, such as a JAVA application or a .NET application, an Oracle database or a DB2 database, an IBM MQ message broker, batch jobs to Azure Batch comprising of a continuous integration and deployment framework 216, an automated test framework 218, a middle ware re-platform 220, and cloud friendly design patterns 222 after transforming/re-factoring a source batch job and associated scheduler of the source application environment while retaining connections of the source batch job and associated scheduler in the target application environment. The sub-steps in automated re-platforming 208 is to upgrade batch and scheduler connections, interdependencies, links and other supporting components, de-couple front-end and back-end convert all batch jobs, it's components and associated scheduler mechanisms from source batch job to a cloud friendly batch service and corresponding scheduler like Azure Batch, Spring Batch, AWS Batch, Azure Logical App, and the like. All of the components, connections, definitions, queues will be transformed to work in the target batch service and associated scheduler and to achieve the same desired result as in the source batch job and associated scheduler. Once the batch and scheduler components are converted, it executes steps of breaking the source batch job and associated scheduler in to granular components based on the design of the target application environment, fine tuning the code rules, resolving deployment issues and, implementing security would be completed by the consultants to make the target application, database, batch and scheduler fully functional. In one example, Table A and Table B may be used as an example to illustrate an exemplary code transformation.

TABLE A

Exemplary code transformation features

| S.No. | Source Technology | Target Technology |
|---|---|---|
| 1 | Session EJB | Spring Boot |
| 2 | Entity EJB | JPA |
| 3 | Message driven EJB | Spring JMS |
| 4 | Batch | Spring batch |
| 5 | SOAP service | SOAP service + REST end point |
| 6 | JAVA POJO service | Spring boot with REST end points |
| 7 | .NET | .NET Core |
| 8 | Telerik ORM | Entity framework |
| 9 | Weblogic/WebSphere | Tomcat |
| 10 | Oracle/SQL Server/DB2 | Postgres |
| 11 | IBM MQ | AWS SQS/Active MQ |

TABLE B

Exemplary code generation features

| S.No. | Features |
|---|---|
| 1 | API test automation |
| 2 | Junit and Nunit test cases (asserts are manual) |
| 3 | API Proxy (Zuul) |
| 4 | OAuth2 authentication |
| 5 | CI/CD framework |

Further, batch and scheduler cloud re-platforming involves several repetitive steps like batch and scheduler component analysis, refactoring, library upgrades, compiling build scripts, deployment scripts, containerization scripts etc. This results in significant improvement in time to market which in turn can reduce the overall cost and ensure high quality re-platforming.

Figure 3:
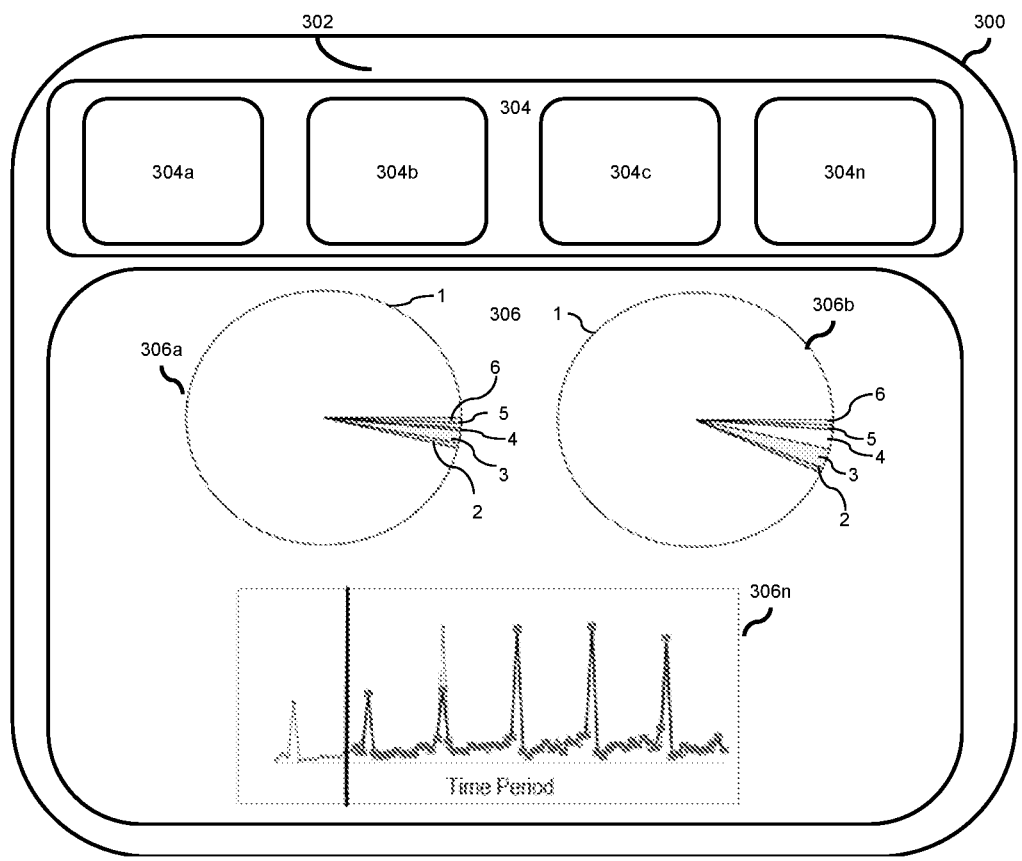
FIG. 3 illustrates an exemplary assessment report automatically generated by an exemplary batch and scheduler migration system in an application environment migration system, in accordance with an embodiment of the present subject matter.

FIG. 3 illustrates an exemplary assessment report 302 automatically generated by an exemplary batch and scheduler migration system in an application environment migration system, in accordance with an embodiment of the present subject matter.

In one embodiment, an assessment module 130 generates an assessment report 302 in an exemplary view 300 after assessing a source application environment comprising code impediments, source code insights, database links, connections, batch and scheduler dependencies, batch and scheduler apps, on-premise design patterns 214, and the like. The assessment report 302 provides automated insights into the time, effort and risk involved in re-platforming the source application environment.

The assessment includes analysis of a source batch job and associated scheduler i.e. a batch and scheduler and the batch and scheduler components, where it performs an automated assessment and scanning of the source batch job and associated scheduler including connections and other dependencies and identifies the inhibitors or blockers (Packages/Frameworks/API/Libraries etc.) which will fail the cloud migration of the batch and scheduler and readiness parameters and thereby provides a detailed assessment report 302. It assesses which on-premises batch and scheduler is used and what messages it is passing within the components of application, compatibility and risk associated with re-platforming to a cloud-based batch and scheduler or target is also assessed. The generation of the report is an automated process along with a few user configurations based on the source application and target application environment.

The assessment report 302 gets an in depth understanding of the quantum of changes that the source batch job and associated scheduler will have to go through to assess the risk, cost, timeline and the impact to other dependent components and batch and scheduler in form of readiness parameters 304 and a visual composition 306. The quantum of changes is summation of all changes required in the batch and scheduler migration. The assessment report 302 has various sections, a few exemplary illustrations for an application snapshot includes parameters, such as a containerization readiness 304a, a re-platform readiness 304b, a DevOps Readiness 304c, a Macro/Micro API readiness 304n, a batch app readiness 304n, a scheduler re-platform readiness 304n, a DB re-platform readiness 304n, a cloud message broker readiness 304n, a cloud batch processing service readiness 304n, among others. Each of the parameters shows a readiness state in percentage (%) or the like to showcase how much ready and/or how much not-ready/blocking/inhibitor states are present for the respective parameter. For example, the containerization readiness 304a shows a container ready percentage with a readiness state and a refactoring required/inhibitor percentage, the re-platform readiness 304b shows a Tomcat ready percentage with a readiness state and a refactoring required/inhibitor percentage, the DevOps Readiness 304c shows a CD ready percentage with a readiness state and a CI readiness/inhibitor percentage, the Macro/Micro API readiness 304n shows a Macro API existing pointer with a readiness state and a Micro API existing/inhibitor state, the batch app readiness 304n shows a re-platform readiness percentage with a batch apps readiness state and a refactoring required blocker/inhibitor percentage, the scheduler re-platform readiness 304n shows a re-platform readiness percentage with an AWS batch readiness state and an Azure Logic App ready/inhibitor percentage, the DB re-platform readiness 304n shows a re-platform readiness percentage with a PostgresSQL readiness state and a refactoring required blocker/inhibitor percentage, the cloud message broker readiness 304n shows a re-platform readiness percentage with a target Amazon MQ readiness state and a refactoring required blocker/inhibitor percentage, and a cloud batch processing service readiness 304n shows a re-platform readiness percentage with a target Azure Batch service readiness state and a refactoring required blocker/inhibitor percentage, and the like. One of the other section of the report 302 is the visual composition 306, such as a database object spread [#Objects] 306a, a database object spread [#LoC] 306b, a platform composition by Number 306n, a platform composition by LoC 306n, and the like. In one example, the database object spread [#Objects] 306a depicts a spread or count or percentage of triggers, sequences, packages, procedures, views, materialised views, functions and tables, the database object spread [#LoC] 306b depicts a spread or count or percentage of triggers, sequences, packages, procedures, views, materialised views, functions and tables, the platform composition by Number 306n depicts a spread or count or percentage of JMS, XML configuration, Web services, Maven build, configuration, HTML, Servlet, Style sheet, reactJS, JSP, Junit, POJO, the platform composition by LoC 306n depicts a spread or count or percentage of JMS, XML configuration, Web services, Maven build, configuration, HTML, Servlet, Style sheet, reactJS, JSP, Junit, POJO, and the like.

Further, various sections of the assessment report 302 provides following information sections application snapshot consist of framework/libraries/packages used, application containerization readiness, application server re-platforming readiness to Tomcat or Kestrel application server, database server re-platforming readiness to PostgreSQL or alike, containerization readiness (to Docker/Kubernetes), batch and scheduler readiness to Amazon MQ cloud batch and scheduler, CI/CD readiness (unit/functional/performance test case, build and continuous integration, automation available), macro and micro API candidates, API readiness (existing and potential API in the application).

The present method provides end to end transformational capabilities by assessing the source application environment, followed by transforming them to cloud using cloud friendly design patterns and finally manages this entire journey by providing your stakeholders and decision makers with transparent visibility for quick decision making. All application dependencies starting from databases to batch programs, schedulers to message brokers will be holistically transformed to cloud. In application analysis section of the assessment report 302 the method analyses the entire source application to identify blockers in source code including design patterns that inhibits cloud migration. All dependencies are also analysed to provide a holistic view for design and planning purposes. It discovers and analyse application components inventory, technology stacks and their dependencies, identify Application's business, data Services and their API readiness, identify the Containerization and Cloud Re-platforming blockers & DevOps readiness and efforts for changes such as JAVA vX.X to JAVA v 1.8; EJB (Session Bean/Entity Bean/MDB) to Spring Boot Service with Spring Framework (Pojo); .NET vX.X to .NET Core v 2.2, IMB MQ to Amazon MQ, batch jobs to Spring batch (in one example).

In database analysis section of the assessment report 302 the method analyses the database to analyse and discover database inventory, data objects details and database size, identify database re-platform readiness and blockers, identify the application blockers and dependencies for database re-platforming and efforts for changes such as Oracle/SQL Server/DB2/Sybase to Postgres/MySQL. In batch & scheduler analysis section of the assessment report 302 the method analyses the batch & scheduler, to analyse and discover batch program inventory and batch schedulers, identify batch scheduler re-platform readiness, blockers and dependencies, identify application batch services for batch re-platforming and efforts for changes such as Autosys/ControlM to AWS Batch (AWS Cloud)/Azure Logic App (Azure Cloud)/Quartz (Private Cloud). In batch and scheduler analysis section of the assessment report 302 the method analyses the batch and scheduler to analyse and discover batch and scheduler inventory and messaging objects, identify batch and scheduler re-platform readiness, blockers and dependencies, identify application blockers and dependencies for batch and scheduler re-platforming and efforts for changes to Azure Batch, and the like.

Figure 4:
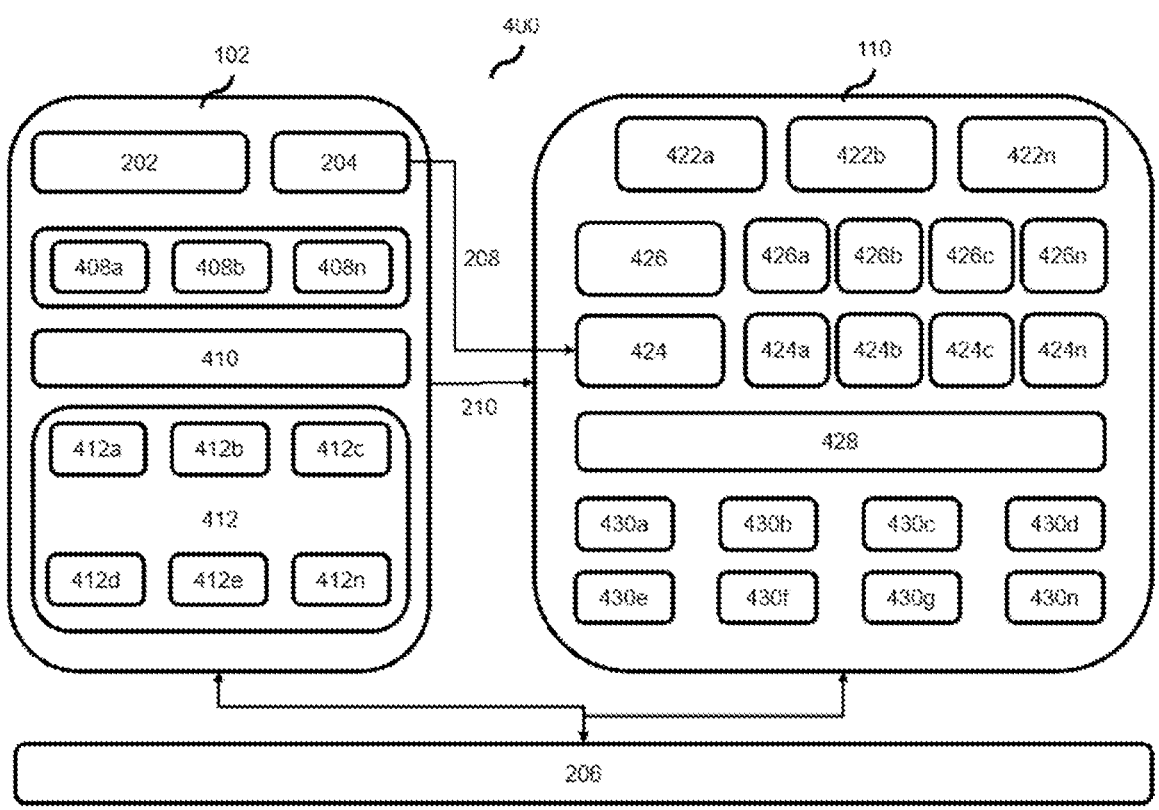
FIG. 4 depicts an exemplary view of an exemplary batch and scheduler migration in an application environment migration method, in accordance with an embodiment of the present subject matter.

FIG. 4 depicts an exemplary view 400 of an exemplary batch and scheduler migration in an application environment migration method, in accordance with an embodiment of the present subject matter.

In one embodiment, an application deployment view 400 with pre and post re-platforming is depicted using the method and system of a source batch job and associated scheduler migration in an application environment migration to a target application environment, in accordance with an embodiment of the present subject matter. A monolith application is generally belonging to a source application environment residing or accessible by a server 102 transforms or migrates to a modernised re-platformed application belonging to a target application environment residing or accessible by a cloud environment 110. Firstly, a code assessment 206 happens for the source application migration to the target application migration. Assessment of the application determines a quantum of change required in code change to remove and change code inhibitors for containerization. The migration is performed with following steps, an application web server with application as accessible by the server 102 is converted to web front instances 422a, 422b, 422n as the case may be. An application server (IIS cluster) 202 is further re-factored into API management layer 426 with various App macro-service instances 426a, 426b, 426c, . . . 426n. The macro-service instances are based on the size and complexity of the source application. In one implementation, a re-factor module 132 performs factoring and repackaging 208 of the macro services into a target application environment.

The source application database 204 is also re-factored PaaS/CaaS cluster 424a to a re-platformed granular database components 424a, 424b, 424c, . . . , 424n of a target database 424. The web front instances 422a, 422b, . . . , 422n and the macro-service instances 426a, 426b, 426c, . . . 426n are further linked to components, including but not limited to a service mesh, an AKS cluster, an App service, an ACI, and the like of the cloud computing environment 110. In one implementation, a source Oracle database is migrated to a PostgresSQL database along with a container/orchestration platform of the cloud environment 110.

Virtual machine instances 408a, 408b, . . . , 408n of the source application are migrated to container cluster of the cloud environment 110. Thus, an on-premise data centre 410 of the source application environment 410 having an on-premise ecosystem 412 is re-platformed 210/migrated to a private/public cloud 428 of the cloud environment 110. In one implementation, components 412a, 412b, 412c, 412d, 412e, . . . , 412n of the on-premise ecosystem 412, including but not limited to, an EBS, a caching, local files, rules engines, a message broker, a batch and scheduler, an authentication protocol, security platforms, and the like are re-platformed 210/migrated to private/public cloud 428 independent or standard services/target components 430a, 430b, 430c, 430d, 430e, 430f, 430g, . . . , 430n including but not limited to, Azure batch, Azure Logical App, AWS Batch service, Spring Batch, Azure queues, Event Hub, Service Bus, AppInsights, Redis Cache, Storage, Vnet, Azure AD, and the like.

In one implementation, the method modifies existing on-premise application to work efficiently on cloud using a container or PaaS, upgrades or changes all blockers related to source code and design patterns and all underlying libraries to make them compatible with container or PaaS, application servers and database is re-platformed to reduce TCO, and monolith application may be de-coupled into services to improve efficiency and velocity.

In one example, Table C may be used as an example to illustrate a re-platforming migration.

TABLE C

Exemplary As-Is State to To-Be State

| As-Is State | To-be State |
| --- | --- |
| JSF, Tiles, Servlets, Struts | JSF, Tiles, Servlets, Struts |
| (EJB) Session Bean | REST Client, Redis HttpSession Cache |
| (EJB) Entity Bean, Hibernate | Tomcat Server |
|  | API Gateway |
|  | REST API |
|  | Spring Boot Macro Services |
|  | (ORM) JPA, Hibernate |
| WebLogic App Server 12c | Tomcat Server 9 |
| Oracle Database 12c | PostgreSQL |
| Microsoft MQ | Azure Service Bus |
| Batch Jobs | Azure Batch Service |

In one implementation, as-is state is JSP based UI to session EJB calls with a few data services and monolithic web application with commercial application server, session persistence and stateful services as-is and migrated to-be state is decoupled web application with JSF WebFront and RESTful Spring Boot macro-services on containers (independent scaling) over API gateway.

Figure 5:
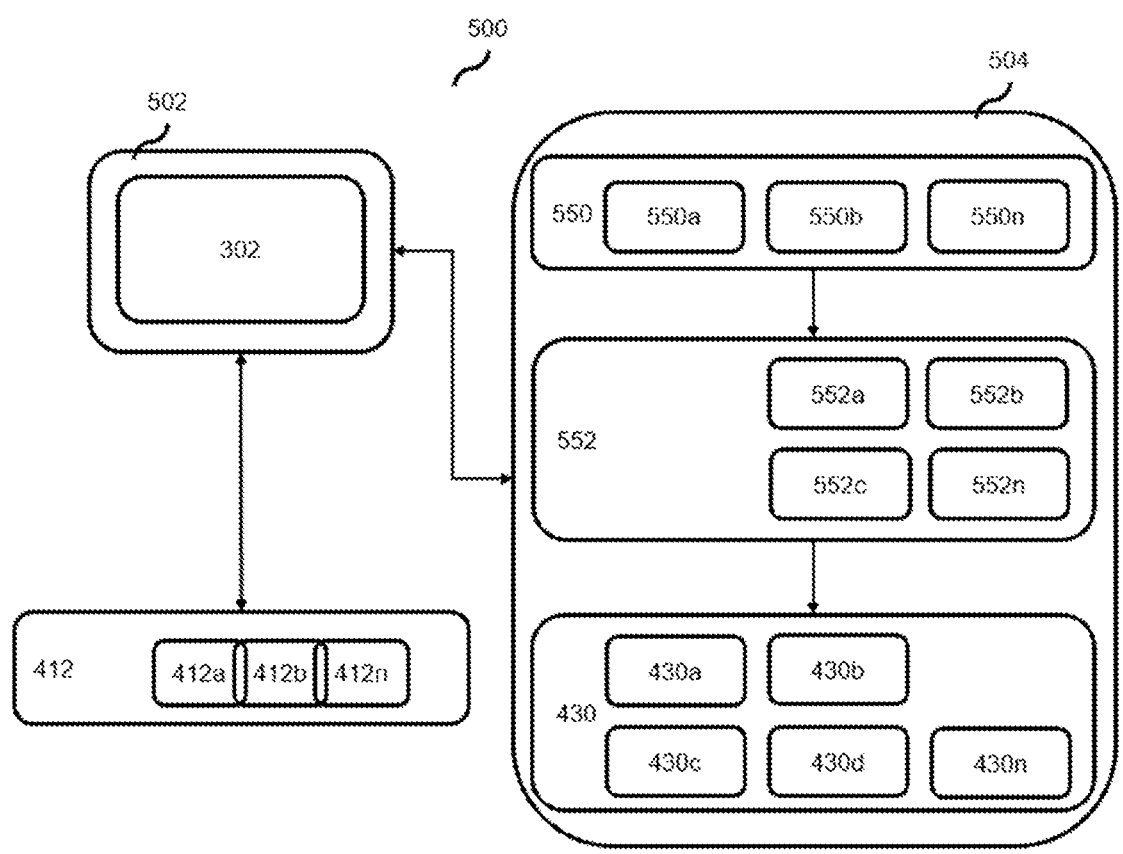
FIG. 5 depicts an exemplary view of an exemplary batch and scheduler migration in an application environment migration method, in accordance with an embodiment of the present subject matter.

FIG. 5 depicts an exemplary view 500 of an exemplary batch and scheduler migration in an application environment migration method, in accordance with an embodiment of the present subject matter.

Cloud native applications enables to convert batch jobs into small independent components which can be ported into self-sufficient containers and run parallel to finish the large amount of task. It will allow to reduce the time and take advantage of the inherent benefits of cloud computing, including flexibility, scalability, and rapid deployment. Using a cloud-based batch and scheduler system gives advantages over on-premises systems as it can easily and efficiently run thousands of batch jobs, provisions the quantity and type of compute resources dynamically and optimally based on volume and requirement of the batch jobs, and does not need to install or manage the batch software or server clusters.

A batch job is a computer program or set of programs processed in batch mode such as a batch job 412. This means that a sequence of commands to be executed by the operating system is listed in a file (often called a batch file, command file, job script, or shell script) and submitted for execution as a single unit. These are jobs that can run without end user interaction, or can be scheduled to run as resources permit. Batch processing is for those frequently used programs that can be executed with minimal human interaction. Any job control language informs an operating system which programs are to be executed and which files will be needed by the executing programs, such as who you are (the submitter of the batch job), what program to run, where input and output are located, and when a job is to run. It's like a manager of the jobs waiting in a queue. It manages the priority of the set of jobs and their associated input data and output results. Generally, it has two sequential steps, the compilation and execution. The batch job scheduler is the application that executes batch jobs, schedulers, its components and batch services. Most batch schedulers support multiple operating systems and platforms and defines batch jobs and their schedule. A batch service is a cloud based job scheduling and compute management platform that enables running large-scale parallel and high performance computing applications efficiently in the cloud such as a target batch service 430. In one example, Azure Batch service provides job scheduling and in automatically scaling and managing virtual machines running those jobs.

In one embodiment, an application deployment view 500 with pre and post re-platforming is depicted using the method and system of a source batch job and associated scheduler migration in an application environment migration to a target application environment, in accordance with an embodiment of the present subject matter. A monolith application is generally belonging to a source application environment residing or accessible by a server 102 transforms or migrates to a modernised re-platformed application belonging to a target application environment residing or accessible by a cloud environment 110.

In one implementation, a method for batch and scheduler migration in an application environment migration is disclosed. The method comprising assessing, by a processor 122 of an application server 102, a batch job 412 of a source application environment and scanning, by the processor 122, at least one scheduling mechanism and components 412a, . . . , 412n of the batch job 412. The method further comprising ascertaining, by the processor 122, a quantum change for migrating the batch job 412 to a target batch service 430 and forecasting, by the processor 122, an assessment statistic 302 that provides at least one functional readiness 304 and a timeline 306 to complete the migration of the batch job 412. The method further comprising generating, by the processor 122, a transformed batch job structure 530a, . . . , 530n that is generated by breaking the batch job 412 in accordance with the target batch service 430 while retaining the scheduling mechanism and updating, by the processor 122, containerized batch service components 532a, . . . , 532n of the target batch service 430 as per the forecasted assessment statistic 302 and the transformed batch job structure 530a, . . . , 530n. Thereby, migrating, by the processor 122, the batch job 412 to the target batch service 430, wherein the migration re-platforms the updated containerized batch service components 532a, . . . , 532n.

For cloud re-platforming firstly, the method accesses on-premise ecosystem 412 having a batch and scheduler or a source batch job and associated scheduler 412 having components, such as definitions and queues, the components 412a, 412b, . . . , 412n of the on-premise ecosystem 412, including but not limited to, an EBS, a caching, local files, rules engines, a message broker, an authentication protocol, security platforms, and the like are re-platformed to the target batch service and associated scheduler 430 having target components 430a, 430b, 430c, 430d, . . . , 430n including but not limited to, Spring Batch, Azure batch, Azure Logical App, AWS Batch service, Azure queues, Event Hub, Service Bus, AppInsights, Redis Cache, Storage, Vnet, Azure AD, AWS SNS, Amazon MQ, Azure Service Bus, Azure Event Hubs, and the like. The method executes assessment 502 that runs and performs an assessment to capture a full inventory of batch jobs and batch job components like definitions, queues, connections, size and complexity of the source batch job and associated scheduler, compatibility and risk associated with re-platforming to a cloud friendly target batch service and associated scheduler 430 like Azure Batch and to break the monolith to granular containerized components. Once this assessment is completed, the assessment step 502 generates an interactive HTML assessment report 302 with drill down features in a format that is easy to be consumed by technical and business users. The assessment report ascertains a quantum change for migrating the source batch job, scheduler, and components 412a, 412b, . . . , 412n to a target batch service and associated scheduler 430 and forecasts an assessment statistic 302 that provides functional readiness parameters, inhibitors, and a timeline to complete the migration of the batch job, scheduler, and components 412a, 412b, . . . , 412n. The assessment report 302 will be used by database architects and application SME to come up with a design for the new re-platformed database and corresponding application by reviewing the provided cloud batch and scheduler service readiness among other parameters.

In a next batch job and scheduler transformation step to execute batch and scheduler re-platforming 504, the method will perform the following 2 main functions. First, generating a transformed batch job structure 530a, 550b, . . . , 530n by breaking the source batch job 412 in accordance with the target batch service 430 while retaining the scheduling mechanism. The transformed batch jobs 530 includes create small independent components 530a, and priority and sequence components 530b. The step transforms the batch job 412 to an intermediate structure in line with the target batch service 430. In an example to Spring batch, Azure Batch, or AWS Batch, and the like. All of the components will be transformed to work in the target batch service and associated scheduler and to achieve the same desired result as in the source batch job and associated scheduler. Once the batch job, scheduling mechanism, components and connections are converted, then the batch and scheduler is broken to granular components based on the design of the application. The method takes care to avoid data corruption and distributed transactional issues in the target application environment and helps to function properly. Secondly, re-platforming by updating containerized batch service components 532a, 532b, 532c, . . . , 532n of the target batch service 430 as per the forecasted assessment statistic 302 and the transformed batch job structure 530a, . . . , 530n, at this step the containerized batch service 532 includes create the batch processing service in cloud 532a, create job definitions and queues 532b, and configuring queuing and error handling 532c. Further, migrating the source batch job and associated scheduler 412 to the target batch service and associated scheduler 430 by re-platforming the updated containerized batch service components 532a, . . . , 532n into a cloud eco system 430 including the target batch service and associated scheduler 430 having Azure batch 430a, Azure Logical App 430b, AWS Batch service 430c, Spring Batch 430d, in one example.

In one another example, an exemplary batch and scheduler migration method automates the analysis and generate reports which gives details about which on-premises batch and scheduling mechanism are used. The exemplary batch and scheduler migration method automates the analysis and generate reports which gives details about which components are batch processing and which scheduling system used. Further it modifies the batch job code to smaller independent to run parallel component with each instance completing part of the work. The batch processing service creation, setting the job definition, queueing activities are carried out manually in cloud environment. The exemplary batch and scheduler migration method first scans the source code of the application and provides which are the components representing batch processing and what scheduling mechanisms are used to schedule this batch jobs and compatibility and risk associated with re-platforming to a cloud-based batch processing system is assessed. Once this assessment is completed, the exemplary batch and scheduler migration method generates an interactive HTML report with drill down features in a format that is easy to be consumed by technical and business users. This assessment report will be used by Architects and Application SME to come up with a design for the new re-platformed batch processing. Once the design is ready, we can proceed to the next step which is batch and scheduler systems re-platforming. In the batch job re-platforming step, the exemplary batch and scheduler migration method and an SME will perform the following steps, i.e., identify and convert each batch into small independent component which can be ported into self-sufficient containers and run parallel to finish the large amount of task and the SME can manually create the batch service on cloud, setting the job definition, queueing activities in cloud environment. SME can manually create the batch and scheduler service, or SME can manually create the batch and scheduler service can work in hybrid manner or in fully automated way.

The exemplary batch and scheduler migration method provides a capability to understand the current batch jobs and scheduler system used in the source application and a capability to transform the batch job source code to use cloud-based batch processing system in more efficient and effective way.

Figure 6:
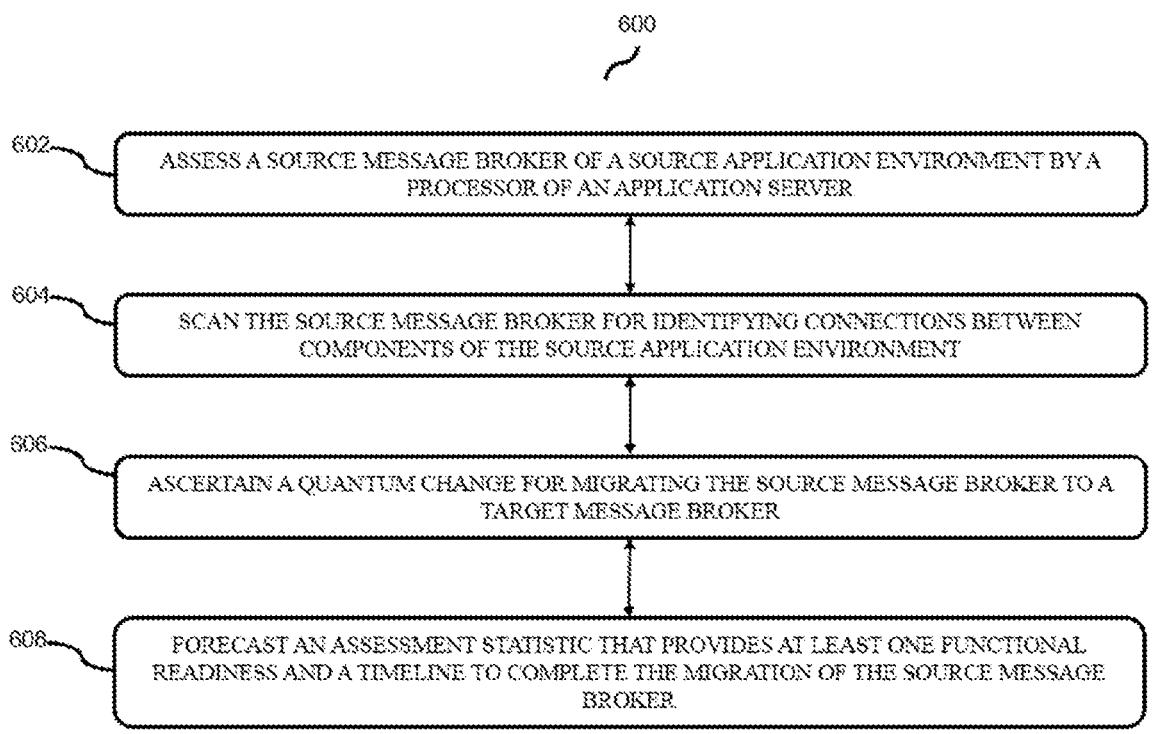
FIG. 6 illustrates an exemplary flowchart of a method of batch and scheduler migration in an application environment migration, in accordance with an embodiment of the present subject matter.

FIG. 6 illustrates an exemplary flowchart 600 of a method of batch and scheduler migration in an application environment migration, in accordance with an embodiment of the present subject matter.

In one implementation, a method 600 for batch and scheduler migration in an application environment migration is shown. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices. The order in which the method is described and is not intended to be construed as a limitation, and any number of the described method blocks can be combined in any order to implement the method or alternate methods. Additionally, individual blocks may be deleted from the method without departing from the spirit and scope of the disclosure described herein. Furthermore, the method may be implemented in any suitable hardware, software, firmware, or combination thereof. However, for ease of explanation, in the embodiments described below, the method may be implemented in the above-described system.

At step/block 602, assess a batch job of a source application environment by a processor 122 of an application server 102. In one implementation, the batch job may be assessed by an assessment module 130.

At step/block 604, scan at least one scheduling mechanism and components of the batch job. In one implementation, the batch job may be scanned by the assessment module 130.

At step/block 606, ascertain a quantum change for migrating the batch job to a target batch service. In one implementation, the quantum change may be ascertained by the assessment module 130.

At step/block 608, forecast an assessment statistic that provides at least one functional readiness and a timeline to complete the migration of the batch job. In one implementation, the assessment statistic may be forecasted by the assessment module 130.

Thus, the method 600 helps in batch and scheduler migration in an application environment migration by providing the forecasted assessment statistic and a timeline for migration from a source application environment to a target application environment.

Figure 7:
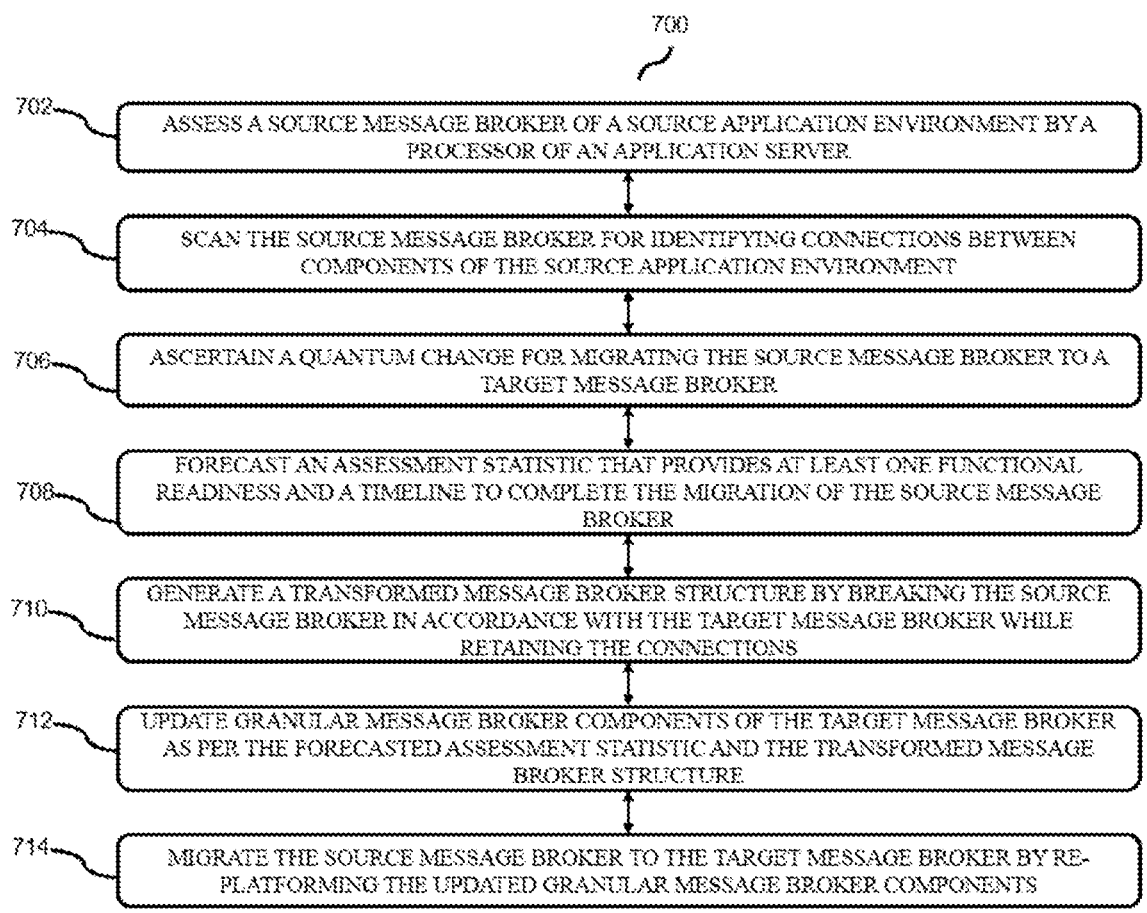
FIG. 7 illustrates another exemplary flowchart of a method of batch and scheduler migration in an application environment migration, in accordance with an embodiment of the present subject matter.

FIG. 7 illustrates another exemplary flowchart 700 of a method of batch and scheduler migration in an application environment migration, in accordance with an embodiment of the present subject matter.

In one implementation, a method 700 for batch and scheduler migration in an application environment migration is shown. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices. The order in which the method is described and is not intended to be construed as a limitation, and any number of the described method blocks can be combined in any order to implement the method or alternate methods. Additionally, individual blocks may be deleted from the method without departing from the spirit and scope of the disclosure described herein. Furthermore, the method may be implemented in any suitable hardware, software, firmware, or combination thereof. However, for case of explanation, in the embodiments described below, the method may be implemented in the above-described system.

At step/block 702, assess a batch job of a source application environment by a processor 122 of an application server 102. In one implementation, the batch job may be assessed by an assessment module 130.

At step/block 704, scan at least one scheduling mechanism and components of the batch job. In one implementation, the batch job may be scanned by the assessment module 130.

At step/block 706, ascertain a quantum change for migrating the batch job to a target batch service. In one implementation, the quantum change may be ascertained by the assessment module 130.

At step/block 708, forecast an assessment statistic that provides at least one functional readiness and a timeline to complete the migration of the batch job. In one implementation, the assessment statistic may be forecasted by the assessment module 130.

At step/block 710, generate a transformed batch job structure that is generated by breaking the batch job in accordance with the target batch service while retaining the scheduling mechanism. In one implementation, the transformed batch job structure may be generated by a re-factor module 132.

At step/block 712, update containerized batch service components of the target batch service as per the forecasted assessment statistic and the transformed batch job structure. In one implementation, the containerized batch service components of the target batch service may be updated by a re-platform module 134.

At step/block 714, migrate the batch job to the target batch service by re-platforming the updated containerized batch service components. In one implementation, the batch job may be migrated to the target batch service by the re-platform module 134.

Thus, the method 700 helps in batch and scheduler migration in an application environment migration by providing a forecasted assessment, re-factoring the code and re-platforming the batch and scheduler for migration from a source application environment to a target application environment.

The present solution is used to re-platform complex batch and scheduler to cloud and deploy them in production environments. A few examples are shown using the method and system of the source batch job and associated scheduler migration in an application environment migration to a target application environment, in accordance with an embodiment of the present subject matter. The following shows preparation, planning and execution along with outcome of the studies. In one example, a cloud re-platforming of JAVABatch App for a leading secondary mortgage firm, a source application environment belongs to a leading secondary mortgage company providing mortgage-backed securities that is a multi-billion-dollar enterprise with operations in USA and is also a publicly traded firm. The primary business challenges are complex JAVABatch application developed 10 years ago on Autosys & EJB on WebLogic MQ by using Message Driven Bean EJB (MDB) Pojo Services, JDBC etc., using IBM MQ message broker, batch jobs, alongside using Oracle database. This application is business-critical and handles key long-running processes. Non-availability of the key SME who developed this application posing challenges in cloud re-platforming. Using the present solution approach, the Oracle database was re-platformed to Postgres using the method steps, the Autosys Scheduler was re-platformed to Quartz and back-end EJB (MDB) were re-platformed to independent Spring JMS with Spring Boot/Batch Service Apps with REST end points. The message broker was re-platformed to Amazon MQ. Each service App were then deployed on separate containers on AWS ECS VPC providing infinite scalability, high availability, high fault tolerance and improved performance. Centralized JOB dependencies of Autosys were refactored to self-managed dependencies using App specific quartz scheduler resulting in reduced operational complexity. Among the top benefits, TCO reduction by over 50%, mainly due to the elimination of WebLogic & Autosys and also by containerization, increase in development productivity due to macro-services and CI/CD automation, total cost of implementation is reduced by over 50% using automation, implementation is to be completed in 6 weeks (the same would have taken 9 months if done manually).

In one another example, present solution is used for cloud re-platforming of .NET Web App for a leading us consulting firm, a source application environment belongs to one of the largest professional services and accounting audits with content management firms with employees in over 700 offices in 150 countries around the world. The primary business challenges are complex .NET web application developed over the years using ASP .NET, C #, Telerik ORM alongside, Microsoft MQ, and using SQL Server database. This application is business critical handling the key B2C function for a leading Professional Service provider. This task became more complicated due to the non-availability of key SME who developed this application. Using the present solution approach, the source application is to be broken into Web front-end and Service Back-end. The back-end legacy .NET services with Telerik ORM is re-platformed to independent .NET Core Service Apps with entity framework with REST End Points. The web front and each service App is then deployed in Kestrel & NGINX on separate containers on Azure cloud providing infinite scalability, high availability, high fault tolerance and improved performance. The web front and macro services were made stateless with Redis cache. Message Broker re-platformed to RabbitMQ, Batch jobs to AWS Batch. The service REST API end points were secured with oAuth2. Automated Testing+CI/CD was enabled for Web-Front and All Macro Services. Among the top benefits, re-platform resulted TCO reduction of over 45% mainly due to elimination of IIS & Telerik ORM, total cost of implementation is reduced by over 45%, increased in development productivity due to macro services and CI/CD automation, completed in six weeks compared to 7 months if done manually.

Although implementations of system and method for batch and scheduler migration in an application environment migration have been described in language specific to structural features and/or methods, it is to be understood that the appended claims are not necessarily limited to the specific features or methods described. Rather, the specific features and methods are disclosed as examples of implementations for batch and scheduler migration in an application environment migration.

We claim:

1. A method comprising:
   assessing, by a processor of an application server, a batch job of a source application environment;
   scanning, by the processor, the batch job to identify at least one scheduling mechanism and components of the batch job;
   ascertaining, by the processor, a quantum change for migrating the batch job to a target batch service;
   converting, by the processor, the batch job into the components and porting the components into respective self-sufficient containers for being processed in parallel by the processor;
   forecasting, by the processor, an assessment statistic, wherein the assessment statistic provides at least one functional readiness and a timeline to complete the migration of the components of the batch job;
   generating, by the processor, a transformed batch job structure, wherein the transformed batch job structure is generated based on the components of the batch job in and batch service components of the target batch service while retaining the scheduling mechanism;
   updating, by the processor, containerized batch service components of the target batch service based on the forecasted assessment statistic and the transformed batch job structure; and
   migrating, by the processor, the batch job to the target batch service, wherein the migration re-platforms the updated containerized batch service components.

2. The method as claimed in claim 1, wherein the quantum change for migrating the batch job to the target batch service is calculated on the basis of a size and complexity of the batch job.

3. The method as claimed in claim 1, wherein the transformed batch job structure is generated utilizing a continuous integration and deployment framework and an automated test framework.

4. The method as claimed in claim 1, wherein the assessment statistic provides at least one inhibitor to complete the migration of the batch job.

5. The method as claimed in claim 1, wherein the transformed batch job structure is generated in accordance with the target batch service while retaining connections between the components of the batch job.

6. The method as claimed in claim 1, wherein the transformed batch job structure is identified by an Artificial Intelligence (AI) Engine.

7. The method as claimed in claim 1, further comprising: implementing, by the processor, batch service definition and service queue in accordance with the target application environment.

8. The method as claimed in claim 1, further comprising: accessing, by the processor, an application code comprising a business logic, links, rule engines, libraries of available environments, standard tools, and coding languages.

9. The method as claimed in claim 1, wherein the batch job of an application environment migrates to the target batch service comprising the steps of: a source batch job to target batch service re-development, a source batch job to target batch service re-factoring, a source batch job to target batch service re-hosting, and a source batch job to target batch service re-platforming.

10. The method as claimed in claim 1, wherein the target batch service is a cloud based batch service ecosystem.

11. A system comprising:
    a processor; and
    a memory coupled to the processor, wherein the processor executes a plurality of modules stored in the memory, and wherein the plurality of modules comprising:
    an assessment module, for assessing a batch job of a source application environment, scanning at least one scheduling mechanism and components of the batch job and ascertaining a quantum change for migrating the batch job to a target batch service, wherein the assessment module converts the batch job into the components and ports the components into respective self-sufficient containers for being processed in parallel and forecasts an assessment statistic that provides at least one functional readiness and a timeline to complete the migration of the components of the batch job;
    a re-factor module, for generating a transformed batch job structure, wherein the transformed batch job structure is generated by based on the components of the batch job and batch service components of the target batch service while retaining the scheduling mechanism; and
    a re-platform module, for updating containerized batch service components of the target batch service based on the forecasted assessment statistic and the transformed batch job structure and migrating the batch job to the target batch service, wherein the migration re-platforms the updated containerized batch service components.

12. The system as claimed in claim 11, wherein the quantum change for migrating the batch job to the target batch service is calculated on the basis of a size and complexity of the batch job.

13. The system as claimed in claim 11, the transformed batch job structure is generated utilizing a continuous integration and deployment framework and an automated test framework.

14. The system as claimed in claim 11, wherein the assessment statistic provides at least one inhibitor to complete the migration of the batch job.

15. The system as claimed in claim 11, wherein the transformed batch job structure is generated in accordance with the target batch service while retaining connections between the components of the batch job.

16. The system as claimed in claim 11, wherein the transformed batch job structure is identified by an Artificial Intelligence (AI) Engine.

17. The system as claimed in claim 11, wherein the re-platform module further comprising: implementing, by the processor, batch service definition and service queue in accordance with the target application environment.

18. The system as claimed in claim 11, wherein the plurality of modules further executes accessing, by the processor, an application code comprising a business logic, links, rule engines, libraries of available environments, standard tools, and coding languages.

19. The system as claimed in claim 11, wherein the batch job of an application environment migrates to the target batch service comprising the steps of: a source batch job to target batch service re-development, a source batch job to target batch service re-factoring, a source batch job to target batch service re-hosting, and a source batch job to target batch service re-platforming.

20. The system as claimed in claim 11, wherein the target batch service is a cloud based batch service ecosystem.

\* \* \* \* \*